United States Patent [19]
Cunningham

[11] Patent Number: 6,014,645
[45] Date of Patent: Jan. 11, 2000

[54] REAL-TIME FINANCIAL CARD APPLICATION SYSTEM

[75] Inventor: Gordon Cotter Cunningham, Kansas City, Mo.

[73] Assignee: Block Financial Corporation, Kansas City, Mo.

[21] Appl. No.: 08/635,334

[22] Filed: Apr. 19, 1996

[51] Int. Cl.[7] .................................................. G06F 17/60
[52] U.S. Cl. ........................... 705/38; 705/35; 235/379; 235/380
[58] Field of Search ................................. 705/38, 35, 41; 235/379, 380, 381

[56] References Cited

U.S. PATENT DOCUMENTS

| | | | |
|---|---|---|---|
| 5,220,501 | 6/1993 | Lawlor | 364/408 |
| 5,351,186 | 9/1994 | Bullock | 364/401 |
| 5,528,490 | 6/1996 | Hill | 364/403 |
| 5,611,052 | 3/1997 | Dykstra | 395/238 |
| 5,659,731 | 8/1997 | Gustafson | 395/604 |
| 5,696,965 | 12/1997 | Dedrick | 395/610 |
| 5,706,442 | 1/1998 | Anderson | 395/227 |
| 5,745,654 | 4/1998 | Titan | 395/22 |
| 5,749,075 | 5/1998 | Toader | 705/14 |

OTHER PUBLICATIONS

Dialog PR 05777108, "Credit Card Network Hits the Internet", p. 1018SE005, Oct. 1995.
American Banker, Network Assemble Card Issuers at an Internet Site, p. 11, Oct. 1995.
Internet Business News, Online Credit Card Sign–up Now Available, Nov. 1995.
Burek, John, The Hot Spot: the Credit Card Network (Web Site Provides Online Repository of Information includes links to credit card, electronic cash and credit report services), v16, n3, p587, Mar. 1996.
Morall, Katherin, Profits by the Numbers, Bankers Monthly, v108 n 11 pp. 25–29, Nov. 1991.
Brennan, Peter, Profitability Scoring Comes of Age, Bank Management, v69 n9 pp. 58–62, Sep. 1993.
Credit Card Management, First Union's Booming Online Branch, Vol. 8 Iss 11 p 1–12, Feb. 1996.
Prince, Cheryl J., Caught in the WEB, Bank Systems Technology, Home Banking, Jul 1995.
Koh, Hian Chye and Tan, Kim Wah, Construction of a Credit Scoring Model to Asses the Default Risk of Credit Card Applicants, International Journal of Management, vol. 11 No. 3, Sep. 1994.

*Primary Examiner*—Allen R. MacDonald
*Assistant Examiner*—Hani M. Kazimi
*Attorney, Agent, or Firm*—Standley & Gilcrest LLP

[57] ABSTRACT

A system is disclosed for presenting financial card (e.g., credit card, debit card) offers to potential customers. Financial card applicant selection criteria and financial card term data are provided by participating financial institutions. An applicant interested in applying for a new financial card accesses the system via the Internet/World Wide Web. The applicant provides personal and financial data that are then analyzed in conjunction with data from outside sources (such as credit bureaus) to determine a financial risk rating for the applicant. The rating is used to locate financial card offers appropriate for the applicant. The applicant then peruses the offers and chooses one that meets his or her personal selection criteria. The applicant's data is then forwarded for processing to the participating financial institution that made the selected offer.

33 Claims, 4 Drawing Sheets

REAL-TIME FINANCIAL CARD APPLICATION SYSTEM

BACKGROUND OF THE INVENTION

1. Field of the Invention

The present invention relates generally to online financial systems for completing various financial transactions. Particularly, the present invention relates to an online, real-time system that allows a user to submit financial card application data and accept a financial card offer from a participating financial institution as based on predefined applicant selection criteria.

2. Description of Related Art

Financial institutions interested in locating new customers for their financial cards (such as credit cards, debit cards, etc.) often rely on direct mailings. These institutions may review personal information regarding income, education, assets (e.g., home ownership), and credit histories before deciding to solicit certain potential customers. In addition, the institutions determine the terms of the financial card offer (e.g., credit limit, interest rate, yearly fee, etc.) which are known in the industry as the "federal boxes." Using detailed selection criteria (e.g., female college graduates who own homes and have incomes over $25,000.00) and offer terms, an institution may send financial card applications to potential customers. These direct mailings are very expensive given the number of recipients who actually respond. The number is generally believed to be less than two percent (2%). Furthermore, because of the lead time and intensive labor required for printing, assembling, and mailing the financial card application packages, an institution must determine the selection criteria and the financial card terms long before the packages are sent. For a given direct mail campaign, once the process begins, there is little, if any, opportunity to change either the selection criteria or the terms. As a result, there is little opportunity to experiment or tune the process to find the most successful combinations of selection criteria and associated financial card terms. Even if the financial institution is willing to incur the costs associated with multiple direct mail campaigns, the target recipients may resent the repeated solicitations.

In addition to the disadvantages of the process for financial institutions, potential customers are also inconvenienced. Those direct mail recipients who are not interested in the offers must sort the "junk mail" from their regular personal and business mail. Those recipients who are interested in the offers must complete the applications manually, mail them back to the financial institutions, wait for them to be processed, and then wait for the financial card to arrive in the mail. Furthermore, some interested customers simply may be missed because, for a variety of reasons, they never make it on a mailing list. Customers who decide to shop on their own for a new financial card may be required to make inquiries at a number of financial institutions, each of which must analyze the applicant's data to determine which, if any, card is appropriate for the applicant. This process is time-consuming because multiple telephone calls are needed and the same information must be repeated for each institution. Furthermore, the potential customer may need to take notes regarding each offer or wait for offer information in the mail in order to compare the offers.

In general, the direct mail method makes it difficult for financial institutions and potential customers to connect. First, the application package may get lost in the mail or, if the intended recipient has moved, the application package may never reach the intended recipient. The inability to easily alter selection criteria and associated financial card term data may mean that would-be customers are excluded from the direct mail process. The lack of a single source of financial card application information makes it difficult for potential customers to learn of or review their options.

SUMMARY OF THE INVENTION

The present invention recognizes the limitations of using direct mailings for matching financial institutions and their card offerings with new customers. The present invention is a sophisticated computer system that allows users to peruse and accept financial card offers from financial institutions interested in locating new customers who meet specific selection criteria. The present invention—which may be accessed via the World Wide Web—prompts a user for pertinent information. Additional credit history data may be obtained using the personal and financial information provided by the user. A user may then be assigned a financial risk rating or grade/score based on the personal, financial, and credit history data provided to the system of the present invention. The financial risk rating may be used to locate financial card offers from financial institutions willing to extend offers to users with the specified rating. The user may then peruse the offers and accept an offer that meets his or her requirements. Following acceptance of an offer, the user's personal information is forwarded to the financial institution for processing and a financial card in accordance with accepted offer terms is sent to the user.

BRIEF DESCRIPTION OF THE DRAWING(S)

DETAILED DESCRIPTION OF THE PREFERRED EMBODIMENT(S)

Preferably, the present invention—Financial Card Application Service (Card Service)—is an electronic financial card application system implemented using the Internet's World Wide Web (WWW) technology. Distributed systems technology and a client/server model are used to create an architecture that allows Internet and Online Service users to access the Card Service using the Uniform Resource Locator/Identifier addressing scheme of the WWW. The Card Service is assigned a unique identifier (e.g., www.FinancialCard.com) that users provide to establish a connection to the WWW site where servers that provide the features and functionality of the present invention are located. Once connected to the site, users interact with HyperText Markup Language (HTML) documents to provide application data (personal and financial information) and to review and accept card offers from financial institutions. Communications between participating entities of the Card Service are accomplished, in part, using the HyperText Transfer Protocol (HTTP) of the WWW. Because the Card Service is based on Internet/WWW technology, it may be accessed through a number of interfaces—for example, native Microsoft® Windows™ applications or hyper-text mark-up language (HTML)/Web browsers.

Figure 1:
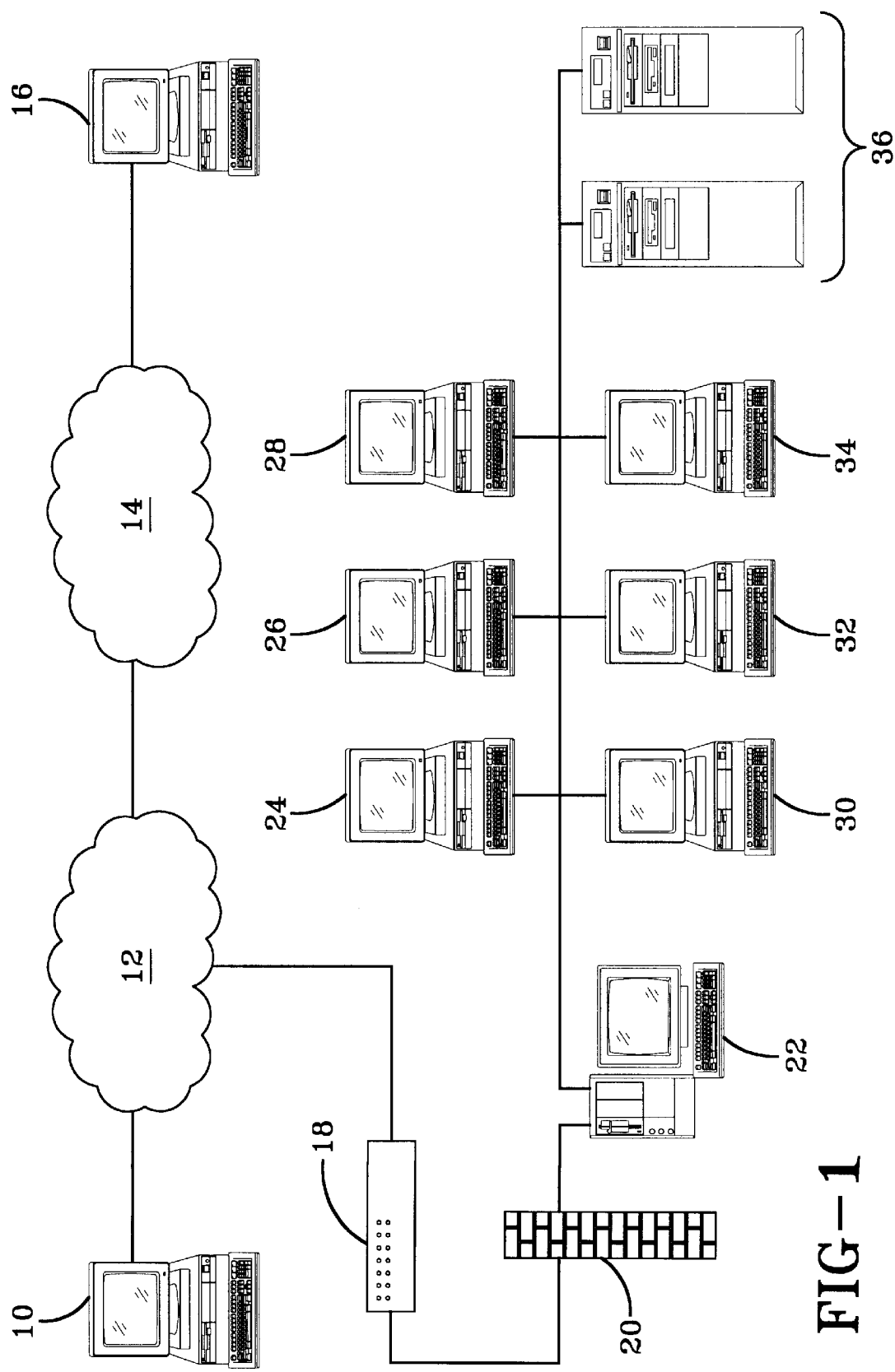
FIG. 1 is a diagrammatic representation of the primary components of the present invention.

Referring to FIG. 1, a diagrammatic representation of the primary components of the present invention is shown. Preferably, users connect to the Card Service via the Internet 12. The Card Service is implemented as a site on the WWW accessible via a unique identifier (e.g., www.FinancialCard.com.) Multiple user interfaces to the Card Service are implemented as different types of clients. Users may establish a direct connection to the Card Service via the Internet 12 by using a Web browser 10. Alternatively, they may establish a connection via an online service such as the CompuServe Information Service 14 and communicate with the Card Service using connection software such as the CompuServe Information Manager for Windows (WinCIM) 16. Methods for providing services via the Internet/WWW are well-known in the art and are not explained here.

In accordance with the standard communication mechanisms of the Internet/WWW, the TCP/IP protocol suite is used for communications between the primary components of the present invention. As shown in FIG. 1, packets in accordance with the TCP/IP protocol suite and destined for the Card Service are routed 18 to a Web Server 22 at the site for processing. Because security is a significant issue for online financial information systems, a Firewall 20 is established between the Router 18 and the Web Server 22. Transactions may then occur in a secure environment.

The Web Server 22, in turn, communicates with the Card Service servers 24–34 that provide the features and functionality of the present invention. Initially, the servers 24–34 may facilitate the retrieval and storage of information from participating financial institutions and credit bureaus. Preferably, the information is stored on database servers 36 with which the Card Service servers 24–34 interact to process transactions on behalf of users. When processing a transaction for a user interested in applying for a new financial card, the servers 24–34 may obtain information from the user and process it with the financial institution data stored on the database servers 36 and credit bureau information stored remotely (e.g., at the credit bureau) to determine which card offers are appropriate for the user. The servers 24–34 also may facilitate the user's review and acceptance of any offers. Finally, the servers 24–34 may communicate the acceptance of offers to the participating financial institutions so the users may receive their new financial cards.

The number of servers 24–34 in the system (including database servers 36) may be increased or decreased depending on the number of transactions processed during a given time period. Some servers may be dedicated to providing a particular type of service (e.g., obtaining information from participating financial institutions) while other servers may be set up to provide all types of services. In addition, all data may be stored in a single database on one or more database servers, or stored in multiple databases on one or more database servers. The configurations of the various servers may change to accommodate an increase or decrease in the number of transactions that are processed within a certain time frame.

Because the present invention is based on Internet/WWW technology, it may be made accessible twenty-four (24) hours a day from around the world. Potential customers may shop for a new card at their own convenience. Because potential customers are located through electronic means, financial institutions may reach them even if their mailing addresses or physical locations change frequently. In addition, the accessibility allows financial institutions to join the service at any time. Furthermore, financial institutions may upload to the databases selection criteria and financial card term data as needed.

Figure 2:
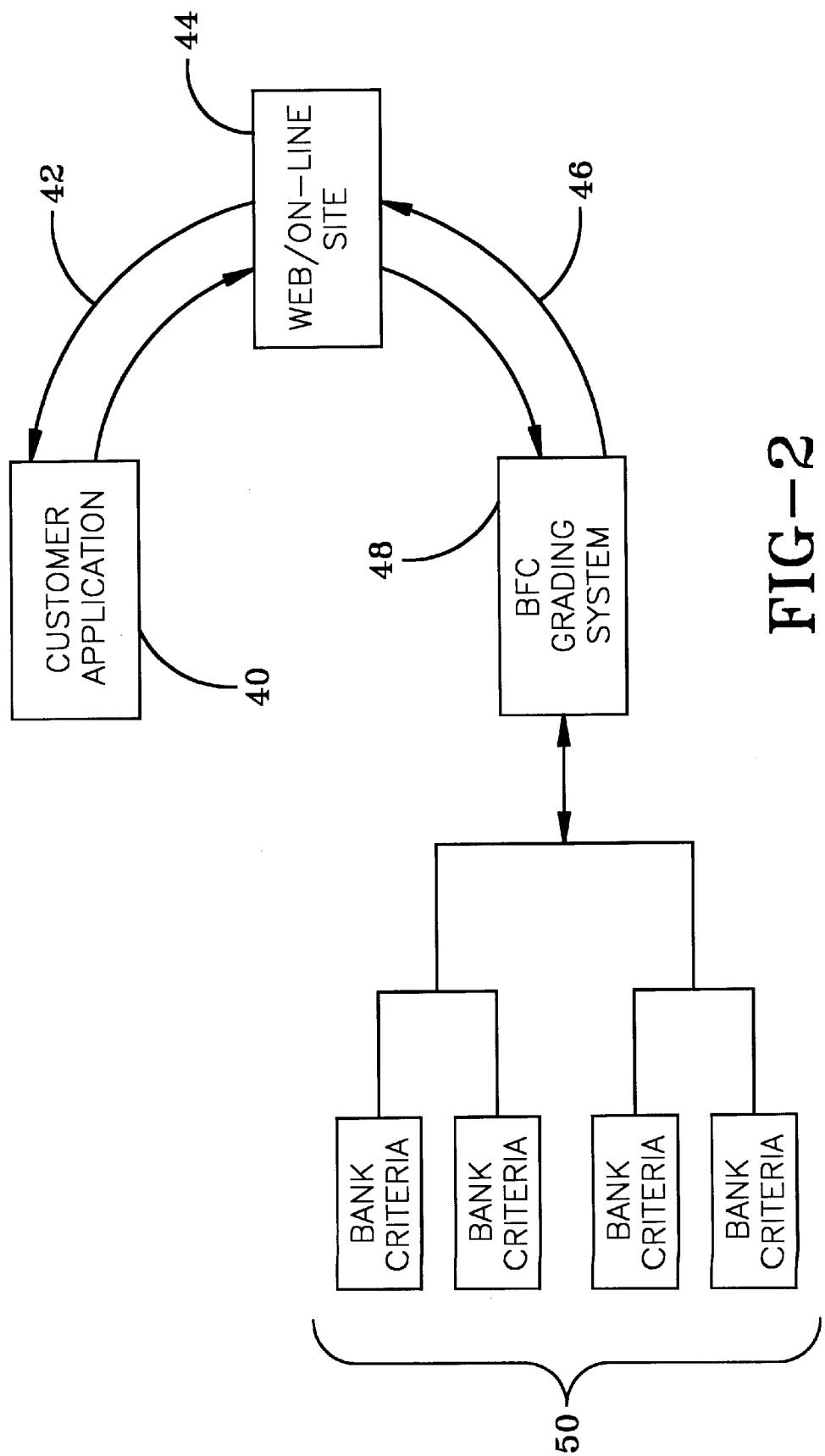
FIG. 2 is a dataflow diagram for a preferred embodiment of the present invention.

Referring to FIG. 2, a dataflow diagram for a preferred embodiment of the present invention is shown. Servers running application programs that provide the features and functionality of the present invention facilitate communication between potential financial card customers and participating financial institutions interested in locating new customers. The process begins when a user (applicant) completes an application 40 by providing personal and financial information (application data) 42. The application data may include the applicant's name, telephone number, home address, e-mail address, income, other assets and liabilities, bank account numbers, etc. The servers at the Web/online site 44 prompt the applicant for the required information and then process it.

A "grading system" process 48 may be employed which uses the application data, as well as other data, as input to determine which financial card offers may be presented to the applicant. Preferably, the grading system assigns a grade/score to the applicant by using the application data and other information such as credit bureau data to derive a letter grade and a numerical score (e.g., A-760). The assigned grade/score may then be used to search each participating financial institution's selection criteria 50 to locate the offers that may be presented to the applicant. Preferably, a financial institution's selection criteria are organized in a matrix that associates financial card term data with a minimum grade/score combination. For example, a bank may have the following selection matrix.

| Grade | Score | Offer (Financial Card Term Data) |
| --- | --- | --- |
| A | 700 and above | Offer 1 - no annual fee, 8.9% APR for 6 months, afterwards APR goes to 12% fixed, no cash advance fees or minimum finance charges |
| B | 780 and above | Offer 2 - no annual fee, 12.9% APR for 6 months, afterwards APR goes to 15% fixed, no cash advance fees or minimum charges |
| all others | | no offer |

If an applicant's assigned grade/score is A-701, Offer 1 is presented is this example. If the applicant's assigned grade/score is A-699, he or she will not receive an offer from this particular financial institution. The process is repeated for each participating financial institution. The applicant is then presented with offers appropriate for the assigned grade/score. The presentation of offers from participating financial institutions is, preferably, done in real-time on the applicant's computer display.

The grade/score assigned to the applicant by the grading system may be viewed as a financial risk rating. It takes into account various criteria and factors to determine whether a particular applicant should be extended an offer and if so, what the terms of the offer should be. For example, a financial institution may decide to offer a credit card with a low interest rate and a high credit limit to an applicant perceived to be a low risk (i.e., has a low financial risk rating.) Alternatively, a financial institution may decide to offer a credit card with a high interest rate and a low credit limit to an applicant perceived to be a high risk (i.e., has a high financial risk rating.)

The applicant may peruse, via the computer display, the "federal box" and other details of each of the offers to find the one that is most attractive (e.g., has the most favorable terms). If the applicant accepts one of the offers, the application data for the applicant is forwarded to the financial institution that made the accepted offer. The financial institution then processes the application and makes arrangements to send the financial card to the applicant.

Figure 3:
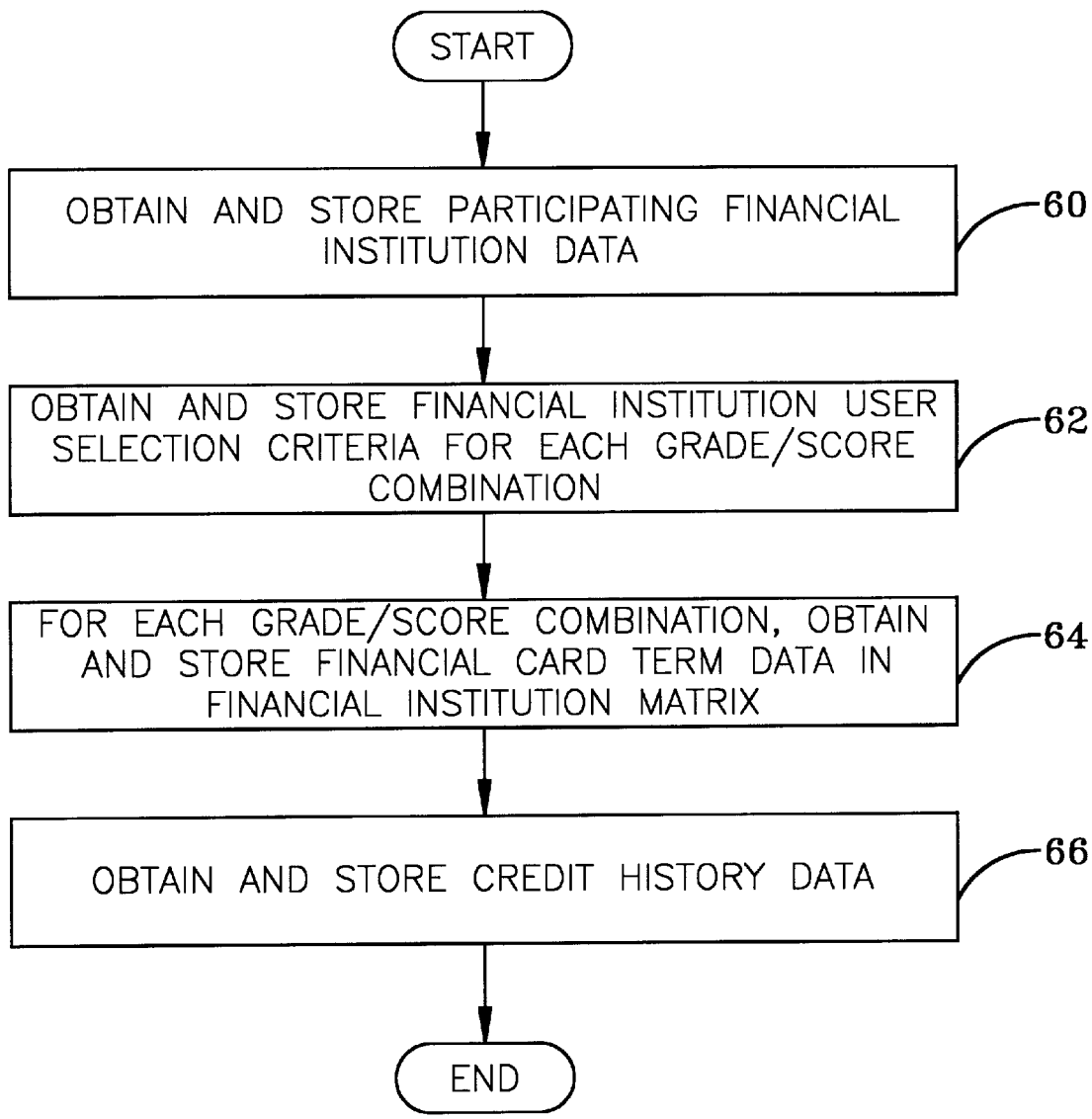
FIG. 3 is a flow chart of the primary steps for obtaining data from financial institutions and other outside sources.

Referring to FIG. 3, a flow chart of the primary steps for obtaining data from financial institutions and other outside sources is shown. Some information may be stored remotely and accessed as needed (e.g., credit bureau data) while other data (e.g., participating financial institution data, financial card term data) may be stored locally to improve performance of the system. In the first step 60, participating financial institutions provide contact and other information that may be needed to complete a transaction using the present invention (participating financial institution data.) For example, information for forwarding accepted offers may be stored for later retrieval. In the next step 62, selection criteria for each participating financial institution is obtained. In the next step 64, the terms of the financial card offers for the acceptable grade/score combinations are specified (financial card term data). Preferably, the selection criteria and financial card term data are organized in a matrix as described above. Different financial card terms may be specified for each grade/score combination for which the financial institution is willing to make an offer. Finally, in step 66, information from credit bureaus and other third party sources may be retrieved and stored. Preferably, the stored information is access or contact information that may be used to obtain up-to-date credit bureau data directly while a transaction is being processed. Using this approach, the most current credit bureau data may be used in determining a rating for an applicant.

In a preferred embodiment of the present invention, financial institutions are permitted to update their selection criteria and financial card term data frequently. The modified data may be uploaded as needed to the databases that support the transaction processing. A financial institution may be able to increase the likelihood its offers are accepted by changing the selection criteria (i.e., financial risk rating) and associated term data. For example, an institution may decide to lower the score associated with a particular grade so that more applicants may be presented with a particular offer. An institution may also decide to add offers for other grade/score combinations.

The ability to alter online financial risk ratings and associated financial card term data in a substantially continuous, real time manner—a unique aspect of the present invention—results in substantial benefits to both financial institutions and financial card customers that direct mail and other forms of offers do not provide due to their static nature. Financial institutions may adapt the selection criteria as needed in accordance with the perceived needs of potential customers. In addition, the flexibility of the present invention (i.e., the ability to electronically compose and present offers) allows financial institutions to change the terms of offers or to increase the number of offers with different terms. Consequently, potential customers are more likely to find a financial card appropriate for their circumstances (e.g., because the grade/score associated with particular term data has changed, or because the term data associated with a particular grade/score has changed, or because new grade/score and term data pairs have been defined.) Using the present invention, customers, who one day are unable to locate a financial card that meets their needs, may, the next day, find one that meets their needs. Consequently, both the customer who accepts the financial card offer and the financial institution that sponsors the offer benefit.

Figure 4:
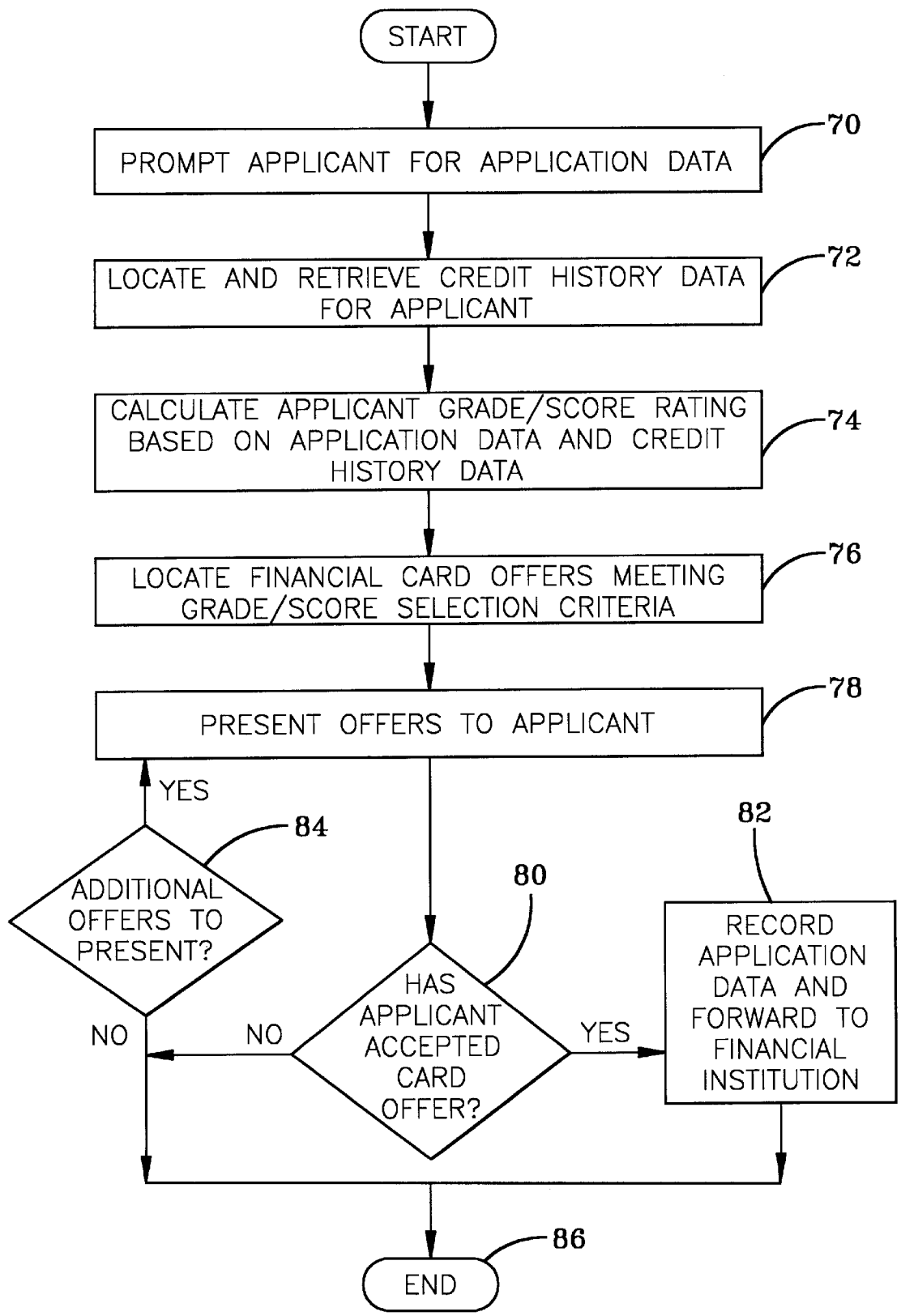
FIG. 4 is a flow chart of the primary steps for processing an applicant transaction.

Referring to FIG. 4, a flow chart of the primary steps for processing a user (applicant) transaction is shown. In the first step 70, the applicant is prompted for application data. Using the application data, the applicant's credit history data are located and retrieved for processing 72. Next 74, a grade/score is calculated and assigned to the applicant. The grade/score is calculated using the application data and credit history data obtained directly from the credit bureau in real-time. The selection criteria as embodied in each financial institution's selection matrix is reviewed to locate the financial card offers appropriate for the applicant 76. Each offer is then presented to the applicant for his or her review 78. Offers may be presented in a variety of formats. For example, a summary of each offer may be presented in the form of a menu from which the applicant may make a selection to review details of the offer. Alternatively, each offer may be presented in a series of single computer screen displays. If the applicant accepts an offer 80, the application data is recorded and forwarded to the financial institution sponsoring the offer 82. Otherwise, offers are presented to the applicant 78 until there are no additional offers to present 84 or the applicant quits 86.

The present invention offers substantial benefits to financial institutions and potential financial card customers. Using the present invention, financial institutions may easily alter selection criteria and associated financial card term data as well as increase the types of offers in order to locate new customers. Significant cost savings may be realized by use of the electronic means of the present invention, rather than direct mailings, to present financial card offers. Financial institutions and potential customers are more likely to connect with one another using the present invention because customers are not required to be in any particular physical location in order to receive an offer. Furthermore, they may review, at their own convenience, a variety of options from a variety of institutions via a single access point thus reducing the amount of time required to shop for a new card.

The present invention has been described with reference to preferred embodiments thereof Various changes in form and details may be made without departing from the scope and spirit of the present invention.

What is claimed is:

1. An electronic financial card application system comprising:

means for storing financial institution data for participating financial institutions;

means for storing financial card term data for each of said participating financial institutions;

means for providing ratings associated with said financial card term data;

means for storing application data for a financial card applicant;

means for providing a rating for said financial card applicant, said rating based on said application data; and means for an applicant to review a plurality of financial card offers, said offers including said financial card term data and located by comparing said rating to an existing rating schedule assigned to said financial card term data.

2. The system of claim 1, having a means for said financial card applicant to accept at least one of said financial card offers.

3. The system of claim 1, having a means for said participating financial institutions to modify said financial card term data.

4. The system of claim 1, having a means for said participating financial institutions to modify said ratings associated with said financial card term data.

5. The system of claim 1, wherein said financial card term data and said associated ratings are organized in a matrix.

6. The system of claim 1, wherein said rating is a financial risk rating.

7. The system of claim 1, wherein said financial card applicant rating is determined in accordance with data from a credit bureau.

8. The system of claim 6, wherein said financial risk rating is a grade and score combination.

9. The system of claim 1, wherein said electronic financial card application system is accessible via the Internet/World Wide Web.

10. The system of claim 1, wherein said financial card term data include an interest rate and credit limit.

11. An electronic method for applying for a financial card, comprising the steps of
   (a) storing financial institution data for participating financial institutions;
   (b) storing financial card term data for each of said participating financial institutions;
   (c) providing ratings associated with said financial card term data;
   (d) prompting an applicant for application data;
   (e) assigning a rating to said applicant;
   (f) locating financial card offers, said offers including said financial card term data selected by comparing said rating with an existing schedule assigned to said financial card term data; and
   (g) presenting said financial card offers to said applicant.

12. The method of claim 11 further comprising the step of determining said applicant's acceptance of at least one of said financial card offers.

13. The method of claim 11 further comprising the step of sending said applicant a financial card in accordance with said financial card term data of said accepted financial card offer.

14. The method of claim 11 wherein said rating is a financial risk rating.

15. The method of claim 11 wherein said rating is a grade and score combination.

16. The method of claim 11 wherein said financial card term data are provided by participating financial institutions.

17. The method of claim 16 wherein said participating financial institutions assign ratings to said financial card term data.

18. The method of claim 16 wherein said participating financial institutions may modify said financial card term data and said assigned ratings.

19. The method of claim 18 further comprising the step of uploading said modified financial card term data and said assigned ratings.

20. The method of claim 17 further comprising the step of organizing said financial card term data and said assigned ratings in a matrix.

21. A method for presenting electronic financial card offers on the World Wide Web comprising the step of:
   (a) creating a World Wide Web site, said site associated with an identifier for accessing said site;
   (b) defining terms for financial cards;
   (c) associating ratings with said financial card terms;
   (d) uploading said financial card terms with said associated ratings to said site;
   (e) defining a rating for a financial card applicant accessing said site using said identifier;
   (f) locating offers to present to said financial card applicant, said offers located by comparing said financial card applicant rating with said ratings associated with said financial card terms; and
   (g) presenting said offers to said financial card applicant.

22. The method of claim 21 further comprising the step of modifying financial card terms and said associated ratings.

23. The method of claim 19 further comprising the step of determining acceptance of at least one of said offers by said applicant.

24. The method of claim 23 further comprising the step of sending information regarding said applicant to a participating financial institution sponsoring said offer accepted by said applicant.

25. The method of claim 24 further comprising the step of sending to said applicant a financial card in accordance with said offer accepted by said applicant.

26. The method of claim 21 wherein said applicant rating is assigned in accordance with review of personal, financial, and credit bureau data regarding said applicant.

27. A financial card application system accessible via the World Wide Web comprising:
   a World Wide Web site with at least one server for communicating with a financial card applicant;
   at least one database for storing financial card term data and ratings assigned to said financial card term data, said financial card term data and assigned ratings provided by participating financial institutions;
   at least one device for accessing data from third party sources;
   application data for said financial card applicant;
   a rating for said financial card applicant, said rating determined in accordance with said application data and data from said third party sources;
   financial card offers for said applicant, said offers including said financial card term data and located by comparing said financial card applicant rating with said ratings assigned to said financial card terms; and
   a computer display for presenting said financial card offers to said applicant.

28. An apparatus for presenting financial card offers to an applicant, comprising:
   at least one server for providing access to financial institution data for a plurality of financial institutions and access to financial card term data for each of said plurality of financial institutions;
   a client computer for establishing a connection to said at least one server and entering financial application data to be processed by said at least one server, said financial application data entered by said applicant; and
   a processing means at said server for associating a first rating with said financial card term data for each of said plurality of financial institutions, for associating a second rating with said applicant, for comparing said first rating and said second rating, and for presenting to said applicant via said client computer financial card term data for which said second rating is at least equal to said first rating.

29. The apparatus of claim 28 wherein said second rating is a financial risk rating determined in accordance with said financial application data entered by said applicant.

30. The apparatus of claim 28 wherein said second rating is a grade and score combination determined in accordance with said financial application data entered by said applicant.

31. The apparatus of claim 28 wherein said at least one server is accessible via the World Wide Web.

32. The apparatus of claim 28 wherein said financial application data includes the applicant's name, telephone number, address, email address, income, other asserts and liabilities, and bank account numbers.

33. The apparatus of claim 28 wherein said financial card term data includes annual fee information and an annual percentage rate.

\* \* \* \* \*

UNITED STATES PATENT AND TRADEMARK OFFICE
CERTIFICATE OF CORRECTION

PATENT NO. : 6,014,645

DATED : January 11, 2000

INVENTOR(S) : Cunningham

It is certified that error appears in the above-identified patent and that said Letters Patent is hereby corrected as shown below:

In column 6, line 39, after the word "thereof" please insert -- . --.

In column 7, line 31, after the word "existing" please insert the word -- rating --.

Signed and Sealed this

Twenty-first Day of November, 2000

Attest:

Q. TODD DICKINSON

*Attesting Officer*  *Director of Patents and Trademarks*

(12) EX PARTE REEXAMINATION CERTIFICATE (5600th)
United States Patent
Cunningham

(10) Number: US 6,014,645 C1
(45) Certificate Issued: Nov. 7, 2006

(54) REAL-TIME FINANCIAL CARD APPLICATION SYSTEM

(75) Inventor: Gordon Cotter Cunningham, Kansas City, MO (US)

(73) Assignee: Block Financial Corporation, Kansas City, MO (US)

Reexamination Request:
No. 90/006,305, Jun. 3, 2002

Reexamination Certificate for:
Patent No.: 6,014,645
Issued: Jan. 11, 2000
Appl. No.: 08/635,334
Filed: Apr. 19, 1996

Certificate of Correction issued Nov. 21, 2000.

(51) Int. Cl.
*G06F 17/60* (2006.01)

(52) U.S. Cl. ............................ 705/38; 705/35; 235/379; 235/380

(58) Field of Classification Search .................. 705/38, 705/35; 235/378, 380
See application file for complete search history.

(56) References Cited

U.S. PATENT DOCUMENTS

| | | | |
|---|---|---|---|
| 5,611,052 A | 3/1997 | Dykstra et al. | 705/38 |
| 5,878,403 A | 3/1999 | DeFrancesco et al. | 705/38 |
| 5,924,082 A | 7/1999 | Silverman et al. | 705/37 |
| 5,940,811 A | 8/1999 | Norris | 705/38 |
| 6,088,686 A | 7/2000 | Walker et al. | |
| 6,105,007 A | 8/2000 | Norris | |
| 6,289,319 B1 | 9/2001 | Lockwood | |

OTHER PUBLICATIONS

Anonymous, "Credit Decision Cut Down to 10 Minutes," Bank Advertising News, Nov. 13, 1989, p. 8, vol. 14, Iss. 10, North Palm Beach.

Morall, Katherine, "Profits by the Numbers," Bankers Monthly, Nov. 1991, pp. 25–29, vol. 108, n. 11.

Brennan, Peter J., "Profitability Scoring Comes of Age," Bank Management, Sep. 1993, pp. 58–62, vol. 69 n. 9.

Koh, Hian C., et al., "Construction of a Credit Scoring Model to Assess the Default Risk of Credit Card Applicants," International Journal of Mgt., Sep. 1994, vol. 11, No. 3.

"Metairie Bank Joins Internet [Third Edition]," Times–Picayune, Sep. 13, 1995, p. C. 1, New Orleans.

Morrall, Katherine, "Direct Marketing Goes On–Line," Bank Marketing, Sep. 1995, p. 21, 6 pgs. vol. 27, Iss. 9, Washington.

Anonymous, "New Sites on the World Wide Web," Management Accounting, Dec. 1995, p. 55, 1 pgs., vol. 77, Iss. 6, Montvale.

Barefoot, Jo Ann S., "When high–tech banking meets paper–based regs (Part 2)," ABA Banking Journal, Mar. 1996, p. 30, 4 pgs., vol. 88, Iss. 3, New York.

How to Find a Loan, Get Credit or Any Other Kind of Financing Now Up On World Wide Web Site, Computergram International, Aug. 17, 1995, ISSN: 0268–716X.

*Primary Examiner*—Jagdish N Patel

(57) ABSTRACT

A system is disclosed for presenting financial card (e.g., credit card, debit card) offers to potential customers. Financial card applicant selection criteria and financial card term data are provided by participating financial institutions. An applicant interested in applying for a new financial card accesses the system via the Internet/World Wide Web. The applicant provides personal and financial data that are then analyzed in conjunction with data from outside sources (such as credit bureaus) to determine a financial risk rating for the applicant. The rating is used to locate financial card offers appropriate for the applicant. The applicant then peruses the offers and chooses one that meets his or her personal selection criteria. The applicant's data is then forwarded for processing to the participating financial institution that made the selected offer.

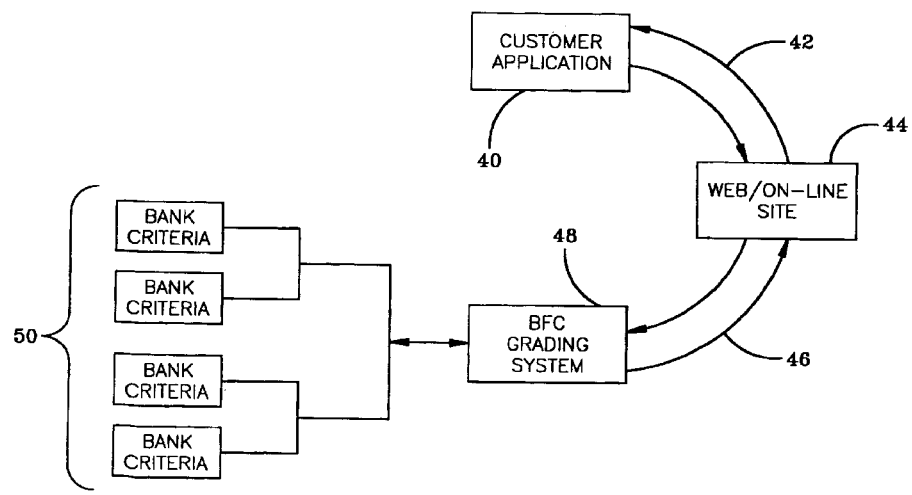

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11–22, 26–31 and 33 is confirmed.

Claims 1–10 are cancelled.

Claims 23 and 32 are determined to be patentable as amended.

Claims 24 and 25, dependent on an amended claim, are determined to be patentable.

New claims 34 and 35 are added and determined to be patentable.

23. The method of claim [19] *21* further comprising the step of determining acceptance of at least one of said offers by said applicant.

32. The apparatus of claim 28 wherein said financial application data includes the applicant's name, telephone number, address, email address, income, other [asserts] *assets* and liabilities, and bank account numbers.

*34. The method of claim 11 wherein said financial card is selected from the group consisting of credit cards and debit cards.*

*35. The method of claim 21 further comprising the step of providing at said World Wide Web site:*

*a) a first web page that presents to said financial card applicant prompts for application data; and*

*b) a second web page that presents said offers to said financial card applicant.*

\* \* \* \* \*